United States Patent [19]

Musto

[11] 3,946,786
[45] Mar. 30, 1976

[54] TIRE CHANGING MACHINE IMPROVEMENT
[75] Inventor: Michael Musto, Maplewood, N.J.
[73] Assignee: Lawrence Peska Associates, Inc., New York, N.Y. ; a part interest
[22] Filed: Oct. 17, 1974
[21] Appl. No.: 501,989

[52] U.S. Cl............................ 157/1.24; 144/288 A
[51] Int. Cl.² ......................................... B60C 25/08
[58] Field of Search.................. 157/1.24, 1.26, 1.28; 144/288 A

[56] References Cited
UNITED STATES PATENTS

| | | | |
|---|---|---|---|
| 3,247,876 | 4/1966 | Scott | 157/1.24 |
| 3,286,760 | 11/1966 | Riepen | 157/1.24 |
| 3,490,512 | 1/1970 | Ghyselinck | 157/1.24 |
| 3,511,296 | 5/1970 | Houston et al. | 157/1.24 |
| 3,580,320 | 5/1971 | Roberts | 157/1.24 |
| 3,709,279 | 1/1973 | Beaman | 157/1.24 |

Primary Examiner—Al Lawrence Smith
Assistant Examiner—James G. Smith
Attorney, Agent, or Firm—Jack D. Slobod

[57] ABSTRACT

An improvement to a known pneumatically operated tire changing apparatus. The improvement includes a sleeve having internal threads and a flange extending substantially perpendicular to the axis of the sleeve.

3 Claims, 3 Drawing Figures

TIRE CHANGING MACHINE IMPROVEMENT

BACKGROUND OF THE INVENTION

The prior art includes a variety of pneumatically powered tire changing apparatus. One such apparatus is shown in U.S. Pat. No. 3,212,552 issued to Foster which shows a single lever for translating the motion of the power source into movement of the upper and lower bead breaker shoes and rotation of the tired tool drive shaft. Such tire changing stands are most often used in service stations or garages or the like where there is a supply of compressed air. It is desirable to use the compressed air to drive the functional components of such tire changing stands because of the greater speed which is possible.

A substantial problem has developed with respect to the use of such pneumatically powered tire changing stands in conjunction with magnesium wheels. Such wheels have become quite popular because of their relative lightness and attractiveness when a chrome plating is applied thereto. Such magnesium wheels however are somewhat brittle and tend to crack easily. Personnel using the existing mechanisms ordinarily will not attempt to either remove or install a tire on such a magnesium wheel and in those cases where such work is done it is often done at the risk of the owner of the wheel. Cracks which do occur are not repairable and because such wheels often cost an excess of $50 each there is a significant problem in changing such tires.

Accordingly, it is a primary object of the invention to provide simple apparatus which may be readily manufactured, which will permit the use of the existing machine in conjunction with magnesium wheels.

More particular, a problem with the prior art apparatus has been a tire hold down member has been used having a tapered exterior surface which rests on the inside diameter of the magnesium wheel. Accordingly, there is line contact between the hold down member and the wheel resulting in high stress concentration during the mounting removal operation.

SUMMARY OF THE INVENTION

In accordance with the invention in one form an adaptor is provided for use in conjunction with a pneumatically operated tire changing stand and a magnesium wheel which includes a sleeve having a bore coaxially disposed. The bore has threads therein dimension and configured for cooperation with the associated tire changing mechanism, the exterior surface of the sleeve is dimensioned to be substantially equal in diameter to the inside diameter of the wheel with which it will be used. A flange extends substantially at right angles, at one extremity of the sleeve, to the axis of the sleeve.

BRIEF DESCRIPTION OF THE DRAWING

While the specification concludes with claims particularly pointing out and distinctly claiming the subject matter which I regard as my invention, is believed the invention will be better understood from the following description taken in conjunction with the accompanying drawing which:

DESCRIPTION OF THE PREFERRED EMBODIMENT

Figure 1:
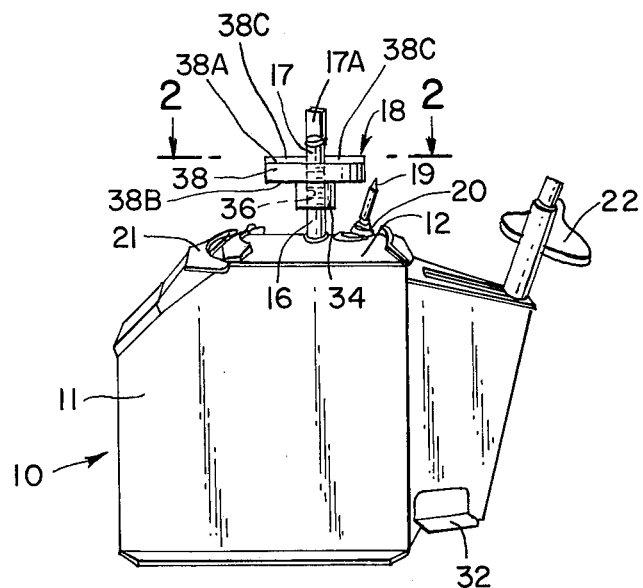
FIG. 1 is a perspective view of one embodiment of the invention mounted on a pneumatic power tire changing stand such as is shown in the Foster U.S. Pat. No. 3,212,552.

Although the present invention may be most suitable for magnesium wheels it may also be used with steel wheels. Referring now to FIG. 1 there is shown the apparatus disclosed in Foster U.S. Pat. No. 3,212,552 in addition to the apparatus of the present invention. The tire changing stand 10 has a generally box like frame 11 of sheet metal material having upstanding walls which serve to enclose most of the functional components thereof as well as further serving as a bearing or support means for the components. The tire changing stand has a generally horizontal rim or tire supporting surface or platform 12 on the top thereof. The tire supporting surface 12 is adapted to support vehicular rims for tires of different sizes. An upright spindle 16 extends through an opening in the platform and has a tire tool drive shaft 17 rotatably journaled therein. The tire tool drive shaft 17 is provided with a tire tool engaging surface 17A for operable engagement with a conventional tire tool (not shown) to drive the same peripherally of the wheel rim to aid in mounting and demounting of a tire from a vehicular rim. A hold down device 18 in accordance with the invention is carried on the spindle and is used to secure the rim and tire on, the platform against vertical movement relative thereto. A substantially upright positioning pin 19 also extends upward from a depending boss 18a which may have the tire supporting platform and is adapted to be position in the bolt holes of a vehicular rim to secure the rim on the platform against rotational movement relative thereto.

The lower bead breaker means 21 is provided at one edge of the tire supporting platform and upper bead breaker means 22 is positioned on the opposite side of the tire supporting platform from the lower bead breaker means for cooperatively breaking the tire bead from the rim thereof in a known manner. A foot pedal 32 is provided for selective operation of the mechanism.

Figure 2:
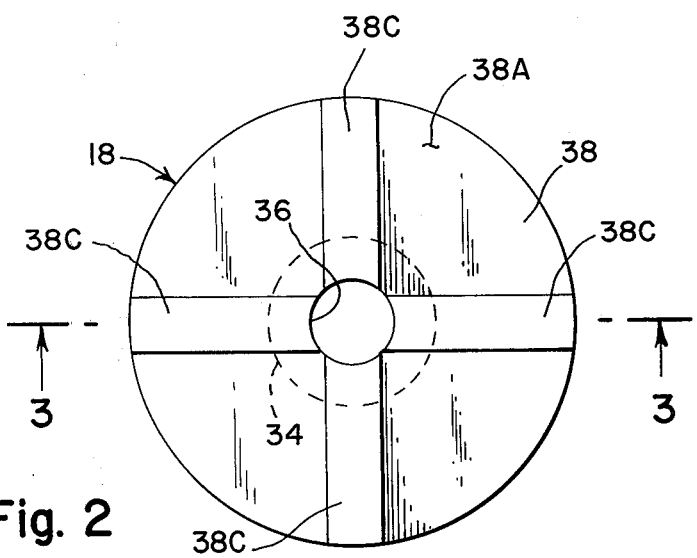
FIG. 2 is a plan view of the adaptor in accordance with the invention which is shown in FIG. 1.
Figure 3:
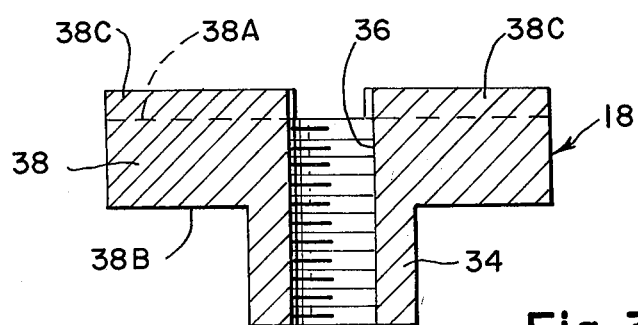
FIG. 3 is a sectional view taken through the line 3—3 of FIG. 2.

Referring now to FIGS. 2 and 3 there is shown in greater detail. The tire hold down device 18 illustrated in FIG. 1 comprises a sleeve 34 having an internal diameter 36 which is cooperatively threaded for engagement with the exterior surface of the spindle 16. The external diameter of the sleeve 34 is sized to be slightly less than the wheel with which it will be used. This is necessary because in the prior art apparatus the tapered exterior surface of the hold down device provided hold down action as well as centering action. Accordingly very large forces were necessary for it to function. Since these forces were applied to the line contact between the magnesium wheel and the hold down device that structure was not satisfactory. It will be apparent to those skilled in the art that the inside diameter of the wheels may vary somewhat and it may be necessary to provide a set device 18 of various sleeve 34 sizes to accommodate a large variety of wheels. Extending at right angles to the axis of the sleeve is a flange 38 having a generally planar upper surface 38A and a generally planar lower surface 38B. In the embodiment shown the circumferential portion of the flange 38 is circular however this is not essential to the invention. Similarly holes (not shown) may be disposed in the flange if desired to reduce material cost particularly where the hold down device is cast as opposed to being machined. The holes or upstanding ribs 38C may be provided to impose a torque on member 38 for tightening or loosening. The hold down device may be manufactured of iron, steel or aluminum. It will be seen that the apparatus in accordance with the invention provides for a greater contact surface with the magnesium wheel with which it will be used and does not rely on vertical forces for centering of the wheel and accordingly the danger of cracking magnesium wheels is essentially eliminated. While particularly suited for magnesium wheels it will be apparent that it can also be used with steel wheels. It will be apparent while the apparatus disclosed is particularly suited for use with the apparatus shown in the Foster patent it will also have application to other powered tire changing apparatus.

Having herein described the invention, what is claimed as new is:

1. In a device for changing a tire on a wheel, said device including a platform for support of said wheel, a threaded spindle upstanding from said platform for passage through the center of said wheel and powered means for vertically moving the spindle relative to the platform, the improved wheel hold down device comprising: a unitary body including a downwardly projecting tubular sleeve having a cylindrical outside diameter dimensioned for loose fitting engagement in the center of said wheel, an internally threaded inside diameter for engagement on said spindle and flange extending radially outwardly from an upper end of said sleeve, said flange having a bottom surface for engagement against said wheel, said bottom surface being planar at an intersection with the cylindrical exterior of said sleeve.

2. The apparatus as described in claim 1 wherein the circumferential portion of said flange is circular and coaxial with the axis of said sleeve.

3. The apparatus of claim 2 wherein said flange has a generally planar top surface including plural angularly spaced apart, radially directed ribs upstanding from said top surface.

* * * * *